US010291027B2

(12) United States Patent
Wu et al.

(10) Patent No.: US 10,291,027 B2
(45) Date of Patent: May 14, 2019

(54) METHOD AND DEVICE FOR CONTROLLING ACTIVE DISTRIBUTION NETWORK

(71) Applicant: Tsinghua University, Beijing (CN)

(72) Inventors: Wenchuan Wu, Beijing (CN); Boming Zhang, Beijing (CN); Hongbin Sun, Beijing (CN); Zhuang Tian, Beijing (CN); Qinglai Guo, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 590 days.

(21) Appl. No.: 15/015,225

(22) Filed: Feb. 4, 2016

(65) Prior Publication Data

US 2017/0133851 A1 May 11, 2017

(30) Foreign Application Priority Data

Nov. 6, 2015 (CN) .......................... 2015 1 0749403

(51) Int. Cl.
*H02J 3/38* (2006.01)
*G05B 17/02* (2006.01)
(Continued)

(52) U.S. Cl.
CPC .............. *H02J 3/381* (2013.01); *G05B 17/02* (2013.01); *H02J 3/06* (2013.01); *H02J 3/16* (2013.01);
(Continued)

(58) Field of Classification Search
CPC ........ H02J 3/381; H02J 2003/007; H02J 3/18; H02J 3/005; G05B 17/02
See application file for complete search history.

(56) References Cited

U.S. PATENT DOCUMENTS 8,756,047 B2 *  6/2014  Patel ........................ G06N 3/08
                                                                703/18
2012/0221265 A1 *  8/2012  Arya ...................... G01R 29/18
                                                                702/61
(Continued)

FOREIGN PATENT DOCUMENTS

CN           103701142 A      4/2014

OTHER PUBLICATIONS

Liu et al. , "Reactive Power and Voltage Control in Distribution Systems with Limited Switching Operations", Nov. 2008, IEEE, pp. 1-2, 7, 10.*

(Continued)

*Primary Examiner* — Robert E Fennema
*Assistant Examiner* — Santosh R Poudel
(74) *Attorney, Agent, or Firm* — Houtteman Law LLC

(57) ABSTRACT

The present disclosure provides a method and a device for controlling an active distribution network, relating to the field of power system operation and control technology. The method includes: creating a power loss objective function; determining first power flow equations; obtaining second power flow equations by performing linearization on the first power flow equations; determining a sub-scale adjustment model of a transformer; obtaining a linearized model of the transformer by performing linearization on the sub-scale adjustment model; obtaining control parameters by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, such that the active distribution net-
(Continued)

work is controlled by the obtained parameters to minimize power loss.

8 Claims, 1 Drawing Sheet

(51) Int. Cl.
    *H02J 3/06*    (2006.01)
    *H02J 3/16*    (2006.01)
    *H02J 3/48*    (2006.01)
    *H02J 3/50*    (2006.01)
    *G05F 1/66*    (2006.01)
    *H02J 3/18*    (2006.01)
    *H02J 3/00*    (2006.01)

(52) U.S. Cl.
    CPC ..................... *H02J 3/48* (2013.01);
        *H02J 3/50* (2013.01); *G05F 1/66* (2013.01);
        *H02J 3/1828* (2013.01); *H02J 3/1835*
        (2013.01); *H02J 3/1878* (2013.01); *H02J
        2003/007* (2013.01); *Y02E 40/34* (2013.01);
        *Y02E 40/76* (2013.01); *Y02E 60/76* (2013.01);
        *Y04S 10/545* (2013.01); *Y04S 40/22* (2013.01)

(56) References Cited

U.S. PATENT DOCUMENTS

| | | | |
|---|---|---|---|
| 2013/0226482 A1* | 8/2013 | Sun ........................ | H02J 3/26 |
| | | | 702/60 |
| 2013/0238148 A1* | 9/2013 | Legbedji ................ | G06Q 10/04 |
| | | | 700/286 |
| 2016/0372922 A1* | 12/2016 | Peng ........................ | H02J 3/00 |

OTHER PUBLICATIONS

Nesimi Ertugrul, "Introduction to AC Circuits", Oct. 24, 2003, InformIT, pp. 14-16.*

China Patent Office, Office action issued for application No. 201510749403.0, which is a China counterpart application of the present US patent application.

Bin Liu, "Optimal Power Flowin Active Distribution Networks with On-load Tap Changer Based on Second-order Cone Programming", Automation of Electric Power System, vol. 39, No. 19, Oct. 10, 2015.

* cited by examiner

METHOD AND DEVICE FOR CONTROLLING ACTIVE DISTRIBUTION NETWORK

CROSS-REFERENCE TO RELATED APPLICATION

This application claims a priority to and benefits of Chinese Patent Application Serial No. 201510749403.0, filed with the State Intellectual Property Office of P. R. China on Nov. 6, 2015, the entire contents of which are incorporated herein by reference.

FIELD

The present disclosure relates to the field of power system operation and control technology, and more particularly to a method and a device for controlling an active distribution network.

BACKGROUND

A development of distributed generation (DG) may optimize energy structure, promote energy conservation and emission reduction and realize economical sustainable development. Recently, a penetration rate of distribution generators, energy storage devices and reactive power compensators in the distribution network is improved increasingly, such that a conventional distribution network gradually becomes an active distribution network which is adjustable and controllable. In a daily management of power networks, an optimal power flow problem aiming at reducing power loss of the active distribution network is an important component to improve an automation level of the active distribution network. Therefore, in order to reduce the power loss, enhance voltage quality and improve an operation standard of the active distribution network, the optimal power flow problem needs to be optimized.

SUMMARY

Embodiments of the present disclosure seek to solve at least one of the problems existing in the related art to at least some extent.

According to embodiments of a first aspect of the present disclosure, a method for controlling an active distribution network is provided. According to this method, taking a transformer model into account based on a mixed integer second-order cone programming model of the optimal power flow problem in the active distribution network and then linearizing the transformer model, a non-linear transformer constraint is transformed into a linear transformer constraint, so as to realize the effective and accurate solution of the optimal power flow problem including the transformer, thereby controlling the active distribution network according to solving results.

The method for controlling an active distribution network includes:
creating a power loss objective function for power flow of the active distribution network;
determining first power flow equations for the active distribution network;
obtaining second power flow equations by performing linearization on the first power flow equations;
determining a sub-scale adjustment model of a transformer in the active distribution network;
obtaining a linearized model of the transformer by performing linearization on the sub-scale adjustment model; and
obtaining a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, such that the active distribution network is controlled by the obtained parameters to minimize power loss.

According to embodiments of a second aspect of the present disclosure, a device for controlling an active distribution network is provided, the device includes:
a processor; and
a memory, configured to store instructions executable by the processor;
in which, the processor is configured to:
create a power loss objective function for power flow of the active distribution network;
determine first power flow equations for the active distribution network;
obtain second power flow equations by performing linearization on the first power flow equations;
determine a sub-scale adjustment model of a transformer in the active distribution network;
obtain a linearized model of the transformer by performing linearization on the sub-scale adjustment model; and
obtain a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, such that the active distribution network is controlled by the obtained parameters to minimize power loss.

According to embodiments of a third aspect of the present disclosure, a non-transitory computer-readable storage medium having stored therein instructions that, when executed by a processor of a device, causes the device to perform a method for controlling an active distribution network, the method including:
creating a power loss objective function for power flow of the active distribution network;
determining first power flow equations for the active distribution network;
obtaining second power flow equations by performing linearization on the first power flow equations;
determining a sub-scale adjustment model of a transformer in the active distribution network;
obtaining a linearized model of the transformer by performing linearization on the sub-scale adjustment model; and
obtaining a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, such that the active distribution network is controlled by the obtained parameters to minimize power loss.

The technical solution provided in above embodiments of the present disclosure has advantages as follows.

1. The sub-scale adjustment model of the transformer is taken into account based on the power flow model (which includes power flow equations, a power loss objective function and constraints) of the active distribution network as the constraint, so the control of the tap position of the transformer is considered and types of controllable parameters considered in the power flow in the active distribution network is supplemented. The tap position of the transformer may be precisely adjusted for power flow in the active distribution network by precise linearization technology for the transformer model.

2. The problem that the power flow model based on a mixed integer second-order cone programming method may become a non-convex problem can be avoided via transforming the non-linear transformer model to the linear transformer model according to the precise linearization technology in the present disclosure, such that the power flow model considering the transformer model may be solved efficiently by a convex programming method.

3. The branch-type power flow equation in accordance with the operation characteristics of the active distribution network is used in the embodiment of the present disclosure, then the second-order cone relaxation method is used to solve the flow equations, such that the power flow model of the active distribution network may be solved efficiently and accurately, thereby controlling the active distribution network by the obtained parameters to minimize power loss, realizing the goal of minimizing power loss, and improving the automation level of the active distribution network.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
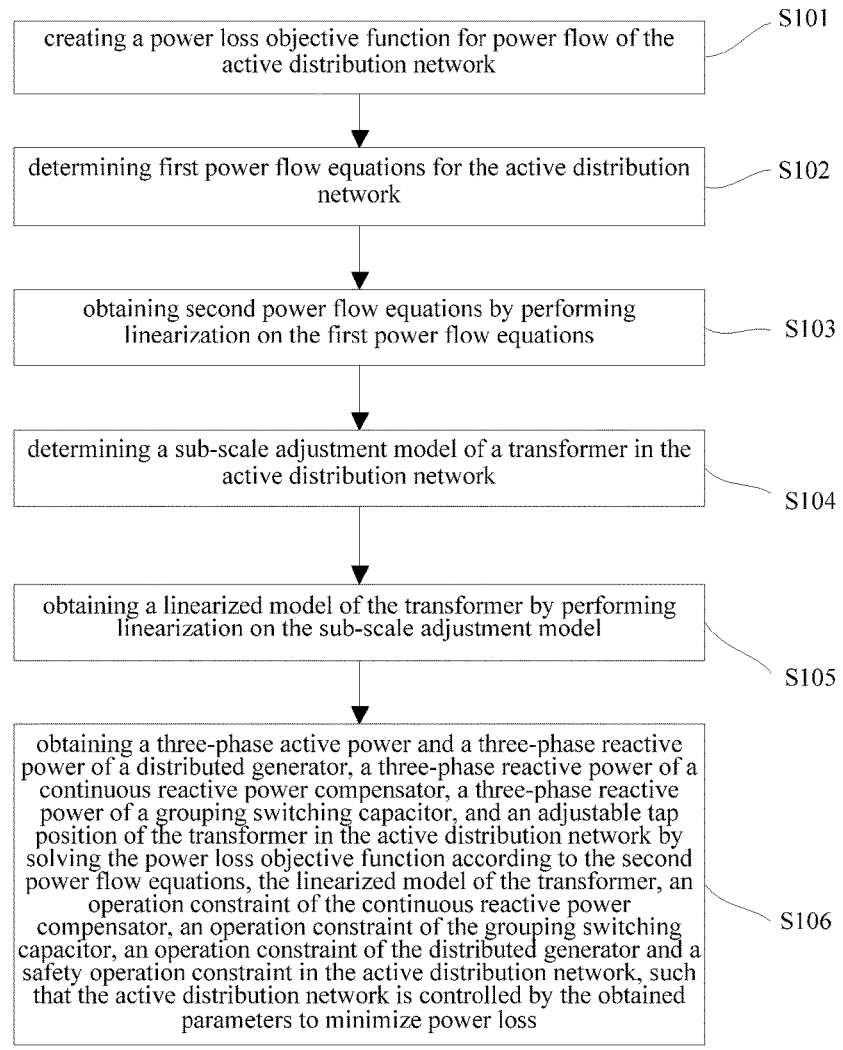
FIG. 1 is a flow chart of a method for controlling an active distribution network according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. In contrast, the present disclosure may include alternatives, modifications and equivalents within the spirit and scope of the appended claims. The same or similar elements and the elements having same or similar functions are denoted by like reference numerals throughout the descriptions.

In the present disclosure, terms such as "first" and "second" are used herein for purposes of description and are not intended to indicate or imply relative importance or significance or to imply the number of indicated technical features. In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations. Thus, the feature defined with "first" and "second" may comprise one or more of this feature. In the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

In the power flow problem of active distribution network, except for controlling continuous variables (such as a three-phase active power and a three-phase reactive power of a distributed generator and a three-phase reactive power of a continuous reactive power compensator) and discrete variables (such as a three-phase reactive power of a grouping switching capacitor), an adjustable tap position of the transformer in the active distribution network is also controlled. Performing a control on the adjustable tap position of the transformer may further reduce a power loss on the active distribution network, improve voltage quality, and improve operation level of the active distribution network. It needs to add the model of the transformer into the power flow model when introducing the control variable of the adjustable tap position of the transformer into the optimal power flow problem. However, a non-convex problem for the power flow in the active distribution network may be caused by a non-linear parameter of a transformer ratio in the transformer model, and in order to void this problem, a method and a device for controlling an active distribution network is provided in the present disclosure.

As shown in FIG. 1, the method in the present disclosure includes following steps.

In step S101, a power loss objective function for power flow of the active distribution network is created.

Figure 2:
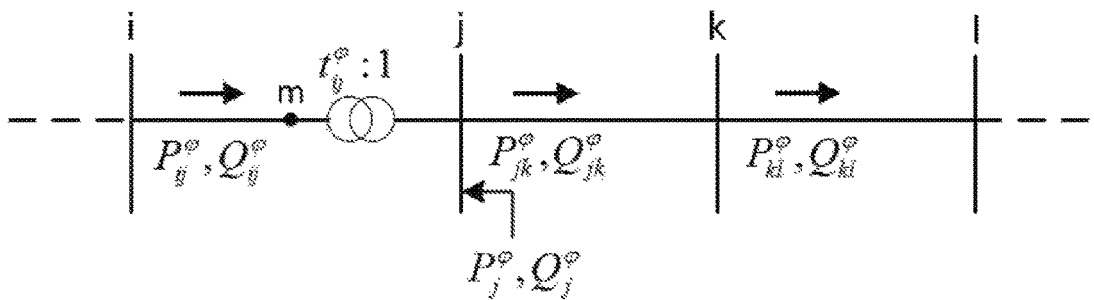
FIG. 2 is a schematic diagram of a three-phase active distribution network with four nodes according to an embodiment of the present disclosure.

Specifically, the active distribution network includes nodes, branches with the transformer and branches without the transformer. For example, as shown in FIG. 2, i, j, k, l respectively represents the node, ij, jk, kl respectively represents the branch, the branch ij has the nodes i and j as two ends, the branch jk has the nodes k and j as two ends, and the branch kl has the nodes k and l as two ends, in which ij represents the branch with the transformer and jk, kl respectively represents the branch without the transformer.

In an embodiment of the present disclosure, the power loss objective function is denoted by a formula of $$\min \Sigma R_{ij}^{\varphi} I_{ij}^{\varphi 2} \tag{1}$$

where, $\varphi$ represents three phases A, B, and C, $R_{ij}^{\varphi}$ represents a three-phase branch resistance of the branch ij, $I_{ij}^{\varphi}$ represents a three-phase branch current of the branch ij and min represents a minimum operator. It should be to understand that, the branch ij in this formula (1) includes the branches with the transformer and the branches without the transformer.

In step S102, first power flow equations for the active distribution network is determined.

In an embodiment of the present disclosure, the first power flow equations includes a three-phase branch-type flow equation for each node, a three-phase branch-type flow equation for each branch with the transformer, and a three-phase branch-type flow equation for each branch without the transformer.

Referring to FIG. 2, the determination process of the first flow equations is described more clearly as follows. In the active distribution network shown in FIG. 2, ij represents the branch with the transformer and having the nodes i and j as two ends, im represents the branch without the transformer and mj represents the branch with the transformer, m represents the node introduced by the transformer, $P_{ij}^{\varphi}$, $Q_{ij}^{\varphi}$ respectively represents a three-phase active power and a three-phase reactive power at a head end of the branch ij, $P_{kl}^{\varphi}$, $Q_{kl}^{\varphi}$ respectively represents a three-phase active power and a three-phase reactive power at a head end of the branch kl, $P_j^{\varphi}$, $Q_j^{\varphi}$ respectively represents a three-phase active power net injection and a three-phase reactive power net injection of the note j, and $t_{ij}^{\varphi}$ (represents a three-phase transformer ratio of the transformer in the branch ij.

The three-phase branch-type flow equation for the node m is denoted by formulas of $$P_{ij}^{\varphi} - \frac{P_{ij}^{\varphi 2} + Q_{ij}^{\varphi 2}}{V_i^{\varphi 2}} R_{ij}^{\varphi} = P_{mj}^{\varphi} \tag{2}$$

and $$Q_{ij}^{\varphi} - \frac{P_{ij}^{\varphi 2} + Q_{ij}^{\varphi 2}}{V_i^{\varphi 2}} X_{ij}^{\varphi} = Q_{mj}^{\varphi} \tag{3}$$

where, $P_{mj}^{\varphi}$, $Q_{mj}^{\varphi}$ respectively represents a three-phase active power and a three-phase reactive power at a head end of the branch mj, $V_i^{\varphi}$ represents a three-phase voltage amplitude of the node i, $R_{ij}^{\varphi}$ represents a three-phase branch resistance of the branch ij, and $X_{ij}^{\varphi}$ represents a three-phase branch reactance of the branch circuit ij.

The three-phase branch-type flow equation for the branch im with the transformer is denoted by formulas of $$V_i^{\varphi 2} - V_m^{\varphi 2} = 2(R_{ij}^{\varphi} P_{ij}^{\varphi} + X_{ij}^{\varphi} Q_{ij}^{\varphi}) - (R_{ij}^{\varphi 2} + X_{ij}^{\varphi 2})\frac{P_{ij}^{\varphi 2} + Q_{ij}^{\varphi 2}}{V_i^{\varphi 2}} \tag{4}$$

where, $V_m^{\varphi}$ represents a three-phase voltage amplitude of node m, since the three-phase branch resistance and the three-phase branch reactance of the branch ij is identical to these of the branch im, $R_{ij}^{\varphi}$ also represents a three-phase branch resistance of the branch im and $X_{ij}^{\varphi}$ also represents a three-phase branch reactance of the branch circuit im.

The three-phase branch-type flow equations for the node j is denoted by formulas of $$P_{mj}^{\varphi} + P_j^{\varphi} = P_{jk}^{\varphi} \tag{5}$$

and $$Q_{mj}^{\varphi} + Q_j^{\varphi} = Q_{jk}^{\varphi} \tag{6}$$

The voltage relation of the branch mj is denoted by a formula of $$V_m^{\varphi} = t_{ij}^{\varphi} V_j^{\varphi} \tag{7}$$

where $V_j^{\varphi}$ represents a three-phase voltage amplitude of the node j.

Plugging the three-phase branch-type flow equation for the node m into the three-phase branch-type flow equations for the node j, it is denoted by formulas of $$P_{ij}^{\varphi} - \frac{P_{ij}^{\varphi 2} + Q_{ij}^{\varphi 2}}{V_i^{\varphi 2}} R_{ij}^{\varphi} + P_j^{\varphi} = P_{jk}^{\varphi} \text{ and} \tag{8}$$

$$Q_{ij}^{\varphi} - \frac{P_{ij}^{\varphi 2} + Q_{ij}^{\varphi 2}}{V_i^{\varphi 2}} X_{ij}^{\varphi} + Q_j^{\varphi} = Q_{jk}^{\varphi} \tag{9}$$

Plugging the voltage relation of the branch mj into the three-phase branch-type flow equation for the branch im, the three-phase branch-type flow equations for the branch ij is denoted by formulas of $$V_i^{\varphi 2} - V_{jt}^{\varphi 2} = 2(R_{ij}^{\varphi} P_{ij}^{\varphi} + X_{ij}^{\varphi} Q_{ij}^{\varphi}) - (R_{ij}^{\varphi 2} + X_{ij}^{\varphi 2})\frac{P_{ij}^{\varphi 2} + Q_{ij}^{\varphi 2}}{V_i^{\varphi 2}} \text{ and} \tag{10}$$

$$V_{jt}^{\varphi} = t_{ij}^{\varphi} V_j^{\varphi}. \tag{11}$$

According to the derivation of the line shown in FIG. 2, the three-phase branch-type flow equation for each node j is denoted by formulas of $$\sum_{i \in \Phi(j)} \left( P_{ij}^{\varphi} - \frac{P_{ij}^{\varphi 2} + Q_{ij}^{\varphi 2}}{V_i^{\varphi 2}} R_{ij}^{\varphi} \right) + P_j^{\varphi} = 0 \text{ and} \tag{12}$$

$$\sum_{i \in \Phi(j)} \left( Q_{ij}^{\varphi} - \frac{P_{ij}^{\varphi 2} + Q_{ij}^{\varphi 2}}{V_i^{\varphi 2}} X_{ij}^{\varphi} \right) + Q_j^{\varphi} = 0 \tag{13}$$

where $\Phi(j)$ represents a node-set composed by nodes connected to the node j, i represents a node non-identical to the node j and belonging to $\Phi(j)$.

The branch-type flow equation for the branch ij with the transformer is denoted by formulas of $$V_i^{\varphi 2} - V_{jt}^{\varphi 2} = 2(R_{ij}^{\varphi} P_{ij}^{\varphi} + X_{ij}^{\varphi} Q_{ij}^{\varphi}) - (R_{ij}^{\varphi 2} + X_{ij}^{\varphi 2})\frac{P_{ij}^{\varphi 2} + Q_{ij}^{\varphi 2}}{V_i^{\varphi 2}} \tag{14}$$

$$V_{jt}^{\varphi} = t_{ij}^{\varphi} V_j^{\varphi}. \quad (15)$$

The three-phase branch-type flow equation for a branch kl without the transformer is denoted by a formula of $$V_k^{\varphi 2} - V_l^{\varphi 2} = 2(R_{kl}^{\varphi} P_{kl}^{\varphi} + X_{kl}^{\varphi} Q_{kl}^{\varphi}) - (R_{kl}^{\varphi 2} + X_{kl}^{\varphi 2}) \frac{P_{kl}^{\varphi 2} + Q_{kl}^{\varphi 2}}{V_k^{\varphi 2}} \quad (16)$$

where, $V_k^{\varphi}$, $V_l^{\varphi}$ respectively represents a three-phase voltage amplitude of the node k and the node l, and $R_{kl}^{\varphi}$, $X_{kl}^{\varphi}$ respectively represents a three-phase branch resistance and a three-phase branch reactance of the branch kl.

The three-phase active power net injection and the three-phase reactive power net injection of the node j are denoted respectively by formulas of $$P_j^{\varphi} = P_{j,DG}^{\varphi} - P_{j,d}^{\varphi} \quad (17)$$

and $$Q_j^{\varphi} = Q_{j,DG}^{\varphi} + Q_{j,com}^{\varphi,dis} + Q_{j,com}^{\varphi,con} - Q_{j,d}^{\varphi} \quad (18)$$

where, $P_{j,DG}^{\varphi}$ and $Q_{j,DG}^{\varphi}$ respectively represents a three-phase active power and a three-phase reactive power of a distributed generator connected to the node j, $P_{j,d}^{\varphi}$, $Q_{j,d}^{\varphi}$ respectively represents a three-phase active power and a three-phase reactive power of a load connected to the node j, $Q_{j,com}^{\varphi,dis}$ represents a three-phase reactive power of a grouping switching capacitor connected to the node j, and $Q_{j,com}^{\varphi,con}$ represents a three-phase reactive power of a continuous reactive power compensator connected to the node j.

In step S103, second power flow equations are obtained by performing linearization on the first power flow equations.

Specifically, obtaining second power flow equations by performing linearization on the first power flow equations includes an act of performing the linearization on the first power flow equations according to a second-order cone relaxation method to obtain the second power flow equations.

According to the second-order cone relaxation method, the first power flow equations (12)-(16) are respectively transformed to following linear equations (19)-(23), and then second-order cone relaxation constraints (24) and (25) is added, so as to obtain the second power flow equations (12)-(25), in which $$\sum_{i \in \Phi(j)} (P_{ij}^{\varphi} - L_{ij}^{\varphi} R_{ij}^{\varphi}) + P_j^{\varphi} = 0 \quad (19)$$

$$\sum_{i \in \Phi(j)} (Q_{ij}^{\varphi} - L_{ij}^{\varphi} X_{ij}^{\varphi}) + Q_j^{\varphi} = 0 \quad (20)$$

$$U_i^{\varphi} - U_{jt}^{\varphi} = 2(R_{ij}^{\varphi} P_{ij}^{\varphi} + X_{ij}^{\varphi} Q_{ij}^{\varphi}) - (R_{ij}^{\varphi 2} + X_{ij}^{\varphi 2}) L_{ij}^{\varphi} \quad (21)$$

$$U_{jt}^{\varphi} = t_{ij}^{\varphi 2} U_j^{\varphi} \quad (22)$$

$$U_k^{\varphi} - U_l^{\varphi} = 2(R_{kl}^{\varphi} P_{kl}^{\varphi} + X_{kl}^{\varphi} Q_{kl}^{\varphi}) - (R_{kl}^{\varphi 2} + X_{kl}^{\varphi 2}) L_{kl}^{\varphi} \quad (23)$$

$$L_{ij}^{\varphi} \geq \frac{P_{ij}^{\varphi 2} + Q_{ij}^{\varphi 2}}{U_i^{\varphi}} \quad (24)$$

$$L_{kl}^{\varphi} \geq \frac{P_{kl}^{\varphi 2} + Q_{kl}^{\varphi 2}}{U_k^{\varphi}} \quad (25)$$

where, $U_i^{\varphi}$, $U_j^{\varphi}$, $U_{jt}^{\varphi}$, $U_k^{\varphi}$, $U_l^{\varphi}$, $L_{ij}^{\varphi}$ and $L_{kl}^{\varphi}$ is respectively denoted by following formulas:

$$U_i^{\varphi} = V_i^{\varphi 2}, U_j^{\varphi} = V_j^{\varphi 2}, U_{jt}^{\varphi} = V_{jt}^{\varphi 2}, U_k^{\varphi} = V_k^{\varphi 2}, U_l^{\varphi} = V_l^{\varphi 2} \quad (26)$$

$$L_{ij}^{\varphi} = I_{ij}^{\varphi 2}, L_{kl}^{\varphi} = I_{kl}^{\varphi 2} \quad (27).$$

$U_i^{\varphi}$, $U_j^{\varphi}$, $U_{jt}^{\varphi}$, $U_k^{\varphi}$, $U_l^{\varphi}$, $L_{ij}^{\varphi}$ and $L_{kl}^{\varphi}$ represent the square of $V_i^{\varphi}$, $V_j^{\varphi}$, $V_{jt}^{\varphi}$, $V_k^{\varphi}$, $V_l^{\varphi}$, $I_{ij}^{\varphi}$ and $I_{kl}^{\varphi}$, respectively. The variables $U_i^{\varphi}$, $U_j^{\varphi}$, $U_{jt}^{\varphi}$, $U_k^{\varphi}$, $U_l^{\varphi}$, $L_{ij}^{\varphi}$ and $L_{kl}^{\varphi}$ may be introduced to transform first items into second items in the first power flow equations (12)-(16).

In step S104, a sub-scale adjustment model of a transformer in the active distribution network is determined.

In an embodiment of the present disclosure, a transformer model of power flow is denoted by a formula of $$U_{jt}^{\varphi} t_{ij}^{\varphi 2} U_j^{\varphi} \quad (28)$$

where t represent the nodes.

For the three-phase transformer ratio $t_{ij}^{\varphi}$ of the transformer in the branch ij, the sub-scale adjustment model is determined by a sub-scale adjustment method as follows:

$$t_{ij}^{\varphi} = t_{ij}^{min} + T_{ij}^{\varphi} \Delta t_{ij} \quad (29)$$

$$\Delta t_{ij} = \frac{t_{ij}^{max} - t_{ij}^{min}}{K_{ij}} \quad (30)$$

$$0 \leq T_{ij}^{\varphi} \leq K_{ij}, T_{ij}^{\varphi} \in \{\text{integers}\} \quad (31)$$

where $t_{ij}^{min}$, $t_{ij}^{max}$ respectively represents a minimum transformer ratio and a maximum transformer ratio of the transformer in the branch ij, $T_{ij}^{\varphi}$ represents an adjustable tap position of the transformer in the branch ij, $\Delta t_{ij}$ represents an adjustable step length of the transformer ratio of the transformer in the branch ij, and $K_{ij}$ represents a maximum adjustable tap position of the transformer ratio of the transformer in the branch ij.

In step S105, a linearized model of the transformer is obtained by performing linearization on the sub-scale adjustment model.

Specifically, in order to perform linearization on the non-linear transformer model (28)-(31), first $\lambda_{ij,n}^{\varphi} \in \{0,1\}$ is defined, and a tap position of the transformer is denoted using a binary mode by a formula of $$t_{ij}^{\varphi} = t_{ij}^{min} + \Delta t_{ij} \sum_{n=0}^{N_{ij}} 2^n \lambda_{ij,n}^{\varphi} \quad (32)$$

where $N_{ij}$ is given as:

$$\min_{N_{ij}} \sum_{n=0}^{N_{ij}} 2^n,$$

subject to $$\sum_{n=0}^{N_{ij}} 2^n \geq K_{ij},$$

such that calculated $N_{ij}$ may ensure that $$\sum_{n=0}^{N_{ij}} 2^n \lambda_{ij,n}^{\varphi}$$

in formula (32) may represent all adjustable tap positions of the transformer with a minimum number of $\lambda_{ij,n}^{\varphi}$.

Then variables $m_{ij}^{\varphi}$ and $m_{ij}^{\varphi}$ are introduced and are defined as:

$$m_{ij}^{\varphi} = t_{ij}^{\varphi} U_j^{\varphi} \quad (33)$$
$$= t_{ij}^{min} U_j^{\varphi} + \Delta t_{ij} \sum_{n=0}^{N_{ij}} 2^n \lambda_{ij,n}^{\varphi} U_j^{\varphi}$$
$$= t_{ij}^{min} U_j^{\varphi} + \Delta t_{ij} \sum_{n=0}^{N_{ij}} 2^n x_{ij,n}^{\varphi}$$

where $x_{ij,n}^{\varphi}$ is defined as:

$$x_{ij,n}^{\varphi} = \lambda_{ij,n}^{\varphi} U_j^{\varphi} \quad (34)$$

In order to remove the non-linear equation (34), the following two inequations may be used as equivalents:

$$0 \leq U_j^{\varphi} - x_{ij,n}^{\varphi} \leq (1 - \lambda_{ij,n}^{\varphi})M \quad (35)$$

and $$0 \leq x_{ij,n}^{\varphi} \leq \lambda_{ij,n}^{\varphi} M \quad (36)$$

where, M is a large positive number (usually be valued as 1000).

So, the equation (28) may be expressed as:

$$U_{jt}^{\varphi} = t_{ij}^{\varphi 2} U_j^{\varphi} \quad (37)$$
$$= t_{ij}^{\varphi} m_{ij}^{\varphi}$$
$$= t_{ij}^{min} m_{ij}^{\varphi} + \Delta t_{ij} \sum_{n=0}^{N_{ij}} 2^n \lambda_{ij,n}^{\varphi} m_{ij}^{\varphi}$$
$$= t_{ij}^{min} m_{ij}^{\varphi} + \Delta t_{ij} \sum_{n=0}^{N_{ij}} 2^n y_{ij,n}^{\varphi}$$

where, $y_{ij,n}^{\varphi}$ is denoted by a formula of $$y_{ij,n}^{\varphi} = \lambda_{ij,n}^{\varphi} m_{ij}^{\varphi} \quad (38)$$

In order to remove the non-linear equation (38), the following two inequations may be used as equivalents:

$$0 \leq m_{ij}^{\varphi} - y_{ij,n}^{\varphi} \leq (1 - \lambda_{ij,n}^{\varphi})M \quad (39)$$

$$0 \leq y_{ij,n}^{\varphi} \leq \lambda_{ij,n}^{\varphi} M \quad (40)$$

According to formulas (32)-(40), the linearized model of the transformer is obtained by performing linearization on the adjustment model with adjustable tap positions as following formulas:

$$U_{jt}^{\varphi} = t_{ij}^{min} m_{ij}^{\varphi} + \Delta t_{ij} \sum_{n=0}^{N_{ij}} 2^n y_{ij,n}^{\varphi} \quad (41)$$

$$m_{jt}^{\varphi} = t_{ij}^{min} U_j^{\varphi} + \Delta t_{ij} \sum_{n=0}^{N_{ij}} 2^n x_{ij,n}^{\varphi} \quad (42)$$

$$0 \leq U_j^{\varphi} - x_{ij,n}^{\varphi} \leq (1 - \lambda_{ij,n}^{\varphi})M \quad (43)$$

$$0 \leq x_{ij,n}^{\varphi} \leq \lambda_{ij,n}^{\varphi} M \quad (44)$$

$$0 \leq m_{ij}^{\varphi} - y_{ij,n}^{\varphi} \leq (1 - \lambda_{ij,n}^{\varphi})M \quad (45)$$

$$0 \leq y_{ij,n}^{\varphi} \leq \lambda_{ij,n}^{\varphi} M \quad (46)$$

$$\Delta t_{ij} = \frac{t_{ij}^{max} - t_{ij}^{min}}{K_{ij}} \quad (47)$$

$$\sum_{n=0}^{N_{ij}} 2^n \lambda_{ij,n}^{\varphi} \leq K_{ij} \quad (48)$$

$$\lambda_{ij,n}^{\varphi} \in \{0, 1\} \quad (49)$$

where, $m_{ij}^{\varphi}$, $y_{ij,n}^{\varphi}$ and $x_{ij,n}^{\varphi}$ are continuous variables, $\lambda_{ij,n}^{\varphi}$ is a variable varying in 0-1 interval, $N_{ij}$ is given as:

$$\min_{N_{ij}} \sum_{n=0}^{N_{ij}} 2^n,$$

subject to $$\sum_{n=0}^{N_{ij}} 2^n \geq K_{ij},$$

such that calculated IV may ensure that $$\sum_{n=0}^{N_{ij}} 2^n \lambda_{ij,n}^{\varphi}$$

may represent all adjustable tap positions of the transformer with a minimum number of $\lambda_{ij,n}^{\varphi}$, M is a large positive number (usually be valued as 1000), and a constraint $$\sum_{n=0}^{N_{ij}} 2^n \lambda_{ij,n}^{\varphi} \leq K_{ij}$$

is to ensure that an interval of the tap position of the transformer does not exceed the maximum tap position.

It should be understood that step S102 and step S104 are performed without a specific order, and step S103 and S105 are performed without a specific order.

In step S106, a three-phase active power and a three-phase reactive power of a distributed generator, a three-phase reactive power of a continuous reactive power compensator, a three-phase reactive power of a grouping switching capacitor, and an adjustable tap position of the transformer in the active distribution network are obtained by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, such that the active distribution network is controlled by the obtained parameters to minimize power loss.

In an embodiment of the present disclosure, the operation constraint of the continuous reactive power compensator is denoted by a formula of $$Q_{i,com}^{\varphi,min} \leq Q_{i,com}^{\varphi,con} \leq Q_{i,com}^{\varphi,max} \qquad (50)$$

where $Q_{i,com}^{\varphi,con}$ is a reactive power of a continuous reactive power compensator connected to the node i, $Q_{i,com}^{\varphi,min}$ and $Q_{i,com}^{\varphi,max}$ respectively represents a minimum and a maximum reactive power of the continuous reactive power compensator connected to the node i.

In an embodiment of the present disclosure, the operation constraint of the grouping switching capacitor is denoted by formulas of $$Q_{i,com}^{\varphi,dis} = d_i^\varphi Q_{i,com}^{\varphi,step} \qquad (51)$$

$$0 \leq d_i^\varphi \leq D_i \qquad (52)$$

$$d_i^\varphi \in \{\text{integers}\} \qquad (53)$$

where $Q_{i,com}^{\varphi,dis}$ represents a three-phase reactive power of a grouping switching capacitor connected to the node i, $Q_{i,com}^{\varphi,step}$ represents a reactive power for each group of continuous reactive power compensators connected to the node i, $d_i^\varphi$ is an integer variable, and $D_i$ represents the maximum group number of continuous reactive power compensators connected to the node i.

In an embodiment of the present disclosure, the operation constraint of the distributed generators is denoted by formulas of $$0 \leq P_{i,DG}^\varphi \leq P_{i,DG}^{\varphi,pre} \qquad (54)$$

$$0 \leq Q_{i,DG}^\varphi \leq Q_{i,DG}^{\varphi,pre} \qquad (55)$$

$$Q_{i,DG}^{\varphi,pre} = P_{i,DG}^{\varphi,pre} \tan \theta \qquad (56)$$

where $P_{i,DG}^\varphi$, $Q_{i,DG}^\varphi$ respectively represents an active power and a reactive power of a distributed generator connected to the node i, $P_{i,DG}^{\varphi,pre}$, $Q_{i,DG}^{\varphi,pre}$ respectively represents a predicted active power and a predicted reactive power of the distributed generator connected to the node i, and $\theta$ represents a power factor angle of the distributed generators connected to the node i.

In an embodiment of the present disclosure, the safety operation constraint in the active distribution network is denoted by formulas of $$U^{min} \leq U_i^\varphi \leq U^{max} \qquad (57)$$

$$L_{ij}^\varphi \leq L^{max} \qquad (58)$$

where $U_i^\varphi$ represents a square of a three-phase voltage of the node i, $U^{min}$ and $U^{max}$ respectively represents a square of a three-phase minimum voltage and a square of a maximum three-phase voltage in the active power distribution network, ij represents a branch with the transformer and having the nodes i and j, $L_{ij}^\varphi$ represents a square of a three-phase current of the branch ij, and $L^{max}$ represents a square of a maximum current of the branch ij.

Specifically, a mixed integer second-order cone programming method is used to solve the power loss objective function according to the second power flow equations, the linearized model of the transformer, the operation constraint of the continuous reactive power compensator, the operation constraint of the grouping switching capacitor, the operation constraint of the distributed generator and the safety operation constraint in the active distribution network, so as to obtain the three-phase active power and the three-phase reactive power of the distributed generator, the three-phase reactive power of the continuous reactive power compensator, the three-phase reactive power of the grouping switching capacitor and the adjustable tap position of the transformer in the active distribution network.

In order to realize the above embodiments, the present disclosure also provides a device for controlling an active distribution network.

Specifically, the device for controlling an active distribution network includes:

a processor; and a memory, configured to store instructions executable by the processor;

in which, the processor is configured to execute any one of the above-described method for controlling an active distribution network.

It should be understood that, with respect to the devices in the above embodiments, the specific operation modes of the device for controlling an active distribution network therein have been described in detail in the embodiments regarding the methods, which will not be elaborated herein.

In order to realize the above embodiments, the present disclosure also provides non-transitory computer-readable storage medium having stored therein instructions that, when executed by a processor of a device, causes the device to perform any one of the above-described method for controlling an active distribution network on a user device.

The technical solution provided in above embodiments of the present disclosure has advantages as follows.

1. The sub-scale adjustment model of the transformer is taken into account based on the power flow model (which includes power flow equations, a power loss objective function and constraints) of the active distribution network as the constraint, so the control of the tap position of the transformer is considered and types of controllable parameters considered in the power flow in the active distribution network is supplemented. The tap position of the transformer may be precisely adjusted for power flow in the active distribution network by precise linearization technology for the transformer model.

2. The problem that the power flow model based on a mixed integer second-order cone programming method may become a non-convex problem can be avoided via transforming the non-linear transformer model to the linear transformer model according to the precise linearization technology in the present disclosure, such that the power flow model considering the transformer model may be solved efficiently by a convex programming method.

3. The branch-type power flow equation in accordance with the operation characteristics of the active distribution network is used in the embodiment of the present disclosure, then the second-order cone relaxation method is used to solve the flow equations, such that the power flow model of the active distribution network may be solved efficiently and accurately, thereby controlling the active distribution network by the obtained parameters to minimize power loss, realizing the goal of minimizing power loss, and improving the automation level of the active distribution network.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling an active distribution network, comprising:
    creating a power loss objective function for power flow of the active distribution network, wherein, the power loss objective function is a minimizing function of power loss of the active distribution network, the active distribution network comprises nodes, branches with the transformer and branches without the transformer;
    determining first power flow equations for the active distribution network;
    obtaining second power flow equations by performing linearization on the first power flow equations;
    determining a sub-scale adjustment model of a transformer in the active distribution network;
    obtaining a linearized model of the transformer by performing linearization on the sub-scale adjustment model; and
    obtaining a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, wherein the active distribution network is controlled by the obtained three-phase active power and a three-phase reactive power of a distributed generator, the three-phase reactive power of a continuous reactive power compensator, the three-phase reactive power of a grouping switching capacitor, and the adjustable tap position of the transformer in the active distribution network to minimize power loss, the controlling causes precise adjustment of tap position of the transformer
    wherein, the first power flow equations comprises a three-phase branch-type flow equation for each node, a three-phase branch-type flow equation for each branch with the transformer, and a three-phase branch-type flow equation for each branch without the transformer;
    wherein, the three-phase branch-type flow equation for a node j is denoted by formulas of $$\sum_{i \in \Phi(j)} \left( P_{ij}^\varphi - \frac{P_{ij}^{\varphi 2} + Q_{ij}^{\varphi 2}}{V_i^{\varphi 2}} R_{ij}^\varphi \right) + P_j^\varphi = 0 \qquad (1)$$

and $$\sum_{i \in \Phi(j)} \left( Q_{ij}^\varphi - \frac{P_{ij}^{\varphi 2} + Q_{ij}^{\varphi 2}}{V_i^{\varphi 2}} X_{ij}^\varphi \right) + Q_{ij}^\varphi = 0 \qquad (2)$$

where, $\Phi(j)$ represents a node-set composed by nodes connected to the node j, i represents a node non-identical to the node j and belonging to $\Phi(j)$, ij represents a branch with the transformer and having the nodes i and j as two ends, $\varphi$ represents three phases A, B, and C, $P_{in}^\varphi$, $Q_{ij}^\varphi$ respectively represents a three-phase active power and a three-phase reactive power at a head end of the branch ij, $V_i^\varphi$ represents a three-phase voltage amplitude of the node i, $R_{ij}^\varphi$ represents a three-phase branch resistance of the branch ij, $P_j^\varphi$, $Q_j^\varphi$ respectively represents a three-phase active power net injection and a three-phase reactive power net injection of the note j and $X_{ij}^\varphi$ represents a three-phase branch reactance of the branch circuit ij;

wherein, the branch-type flow equation for the branch ij with the transformer is denoted by formulas of $$V_i^{\varphi 2} - V_{jt}^{\varphi 2} = 2(R_{ij}^\varphi P_{ij}^\varphi + X_{ij}^\varphi Q_{ij}^\varphi) - (R_{ij}^{\varphi 2} + X_{ij}^{\varphi 2}) \frac{P_{ij}^{\varphi 2} + Q_{ij}^{\varphi 2}}{V_i^{\varphi 2}} \qquad (3)$$

and $$V_{jt}^\varphi = t_{ij}^\varphi V_j^\varphi \qquad (4)$$

where, $t_{ij}^\varphi$ represents a three-phase transformer ratio of the transformer in the branch ij, and $V_j^\varphi$ represents a three-phase voltage amplitude of the node j;

wherein, the three-phase branch-type flow equation for a branch kl without the transformer is denoted by a formula of $$V_k^{\varphi 2} - V_l^{\varphi 2} = 2(R_{kl}^\varphi P_{kl}^\varphi + X_{kl}^\varphi Q_{kl}^\varphi) - (R_{kl}^{\varphi 2} + X_{kl}^{\varphi 2}) \frac{P_{kl}^{\varphi 2} + Q_{kl}^{\varphi 2}}{V_k^{\varphi 2}} \qquad (5)$$

where, k and l respectively represents the node, $V_k^\varphi$, $V_l^\varphi$ respectively represents a three-phase voltage amplitude of the node k and the node l, $P_{kl}^\varphi$, $Q_{kl}^\varphi$ respectively represents a three-phase active power and a three-phase reactive power at a head end of the branch kl, $R_{kl}^\varphi$, $X_{kl}^\varphi$ respectively represents a three-phase branch resistance and a three-phase branch reactance of the branch kl;

wherein, the three-phase active power net injection and the three-phase reactive power net injection of the node j are denoted respectively by formulas of $$P_j^\varphi = P_{j,DG}^\varphi - P_{j,d}^\varphi \qquad (6)$$

and $$Q_j^\varphi = Q_{j,DG}^\varphi + Q_{j,com}^{\varphi,dis} + Q_{j,com}^{\varphi,con} - Q_{j,d}^\varphi \qquad (7)$$

wherein $P_{j,DG}^\varphi$ and $Q_{j,DG}^\varphi$ respectively represents a three-phase active power and a three-phase reactive power of a distributed generator connected to the node j, $P_{j,d}^\varphi$, $Q_{j,d}^\varphi$ respectively represents a three-phase active power and a three-phase reactive power of a load connected to the node j, $Q_{j,com}^{\varphi,dis}$ represents a three-phase reactive power of a grouping switching capacitor connected to the node j, and $Q_{j,com}^{\varphi,con}$ represents a three-phase reactive power of a continuous reactive power compensator connected to the node j, wherein, obtaining second power flow equations by performing linearization on the first power flow equations comprises:

transforming respectively the first power flow equations comprising the formulas (1)-(5) to linear equations (8)-(12) as follows by using the second-order cone relaxation method, in which $$\sum_{i \in \Phi(j)} (P_{ij}^\varphi - L_{ij}^\varphi R_{ij}^\varphi) + P_j^\varphi = 0 \qquad (8)$$

$$\sum_{i \in \Phi(j)} (Q_{ij}^\varphi - L_{ij}^\varphi X_{ij}^\varphi) + Q_j^\varphi = 0 \qquad (9)$$

$$U_i^\varphi - U_{jt}^\varphi = 2(R_{ij}^\varphi P_{ij}^\varphi + X_{ij}^\varphi Q_{ij}^\varphi) - (R_{ij}^{\varphi 2} + X_{ij}^{\varphi 2}) L_{ij}^\varphi \qquad (10)$$

$$U_{jt}^\varphi = t_{ij}^{\varphi 2} U_j^\varphi \qquad (11)$$

$$U_k^\varphi - U_l^\varphi = 2(R_{kl}^\varphi P_{kl}^\varphi + X_{kl}^\varphi Q_{kl}^\varphi) - (R_{kl}^{\varphi 2} + X_{kl}^{\varphi 2}) L_{kl}^\varphi \qquad (12)$$

and adding second-order cone relaxation constraints:

$$L_{ij}^\varphi \geq \frac{P_{ij}^{\varphi 2} + Q_{ij}^{\varphi 2}}{U_i^\varphi} \qquad (13)$$

$$L_{kl}^\varphi \geq \frac{P_{kl}^{\varphi 2} + Q_{kl}^{\varphi 2}}{U_k^\varphi} \qquad (14)$$

where, $U_i^\varphi$, $U_j^\varphi$, $U_{jt}^\varphi$, $U_k^\varphi$, $U_l^\varphi$, $L_{ij}^\varphi$ and $L_{kl}^\varphi$ is respectively denoted by following formulas:

$$U_i^\varphi = V_i^{\varphi 2}, U_j^\varphi = V_j^{\varphi 2}, U_{jt}^\varphi = V_{jt}^{\varphi 2}, U_k^\varphi = V_k^{\varphi 2}, U_l^\varphi = V_l^{\varphi 2} \qquad (15)$$

$$L_{ij}^\varphi = I_{ij}^{\varphi 2}, L_{kl}^\varphi = I_{kl}^{\varphi 2} \qquad (16)$$

$U_i^\varphi$, $U_j^\varphi$, $U_{jt}^\varphi$, $U_k^\varphi$, $U_l^\varphi$, $L_{ij}^\varphi$ and $L_{kl}^\varphi$ represent the square of $V_i^\varphi$, $V_j^\varphi$, $V_{jt}^\varphi$, $V_k^\varphi$, $V_l^\varphi$, $I_{ij}^\varphi$ and $I_{kl}^\varphi$, respectively, the second power flow equations comprising the formulas (8)-(14).

2. The method according to claim 1, wherein, a transformer model of power flow is denoted by a formula of $$U_{jt}^\varphi = t_{ij}^{\varphi 2} U_j^\varphi \qquad (17)$$

where, i, j, t represent the nodes respectively, ij represents a branch with the transformer and having the node i and the node j, $U_{jt}^\varphi$, $U_j^\varphi$ represent the square of $V_{jt}^\varphi$, $V_j^\varphi$ respectively, $\varphi$ represents three phases A, B, and C, $t_{ij}^\varphi$ represents a three-phase transformer ratio of the transformer in the branch ij, and wherein, the sub-scale adjustment model is determined by a sub-scale adjustment method as follows:

$$t_{ij}^\varphi = t_{ij}^{min} + T_{ij}^\varphi \Delta t_{ij} \qquad (18)$$

-continued $$\Delta t_{ij} = \frac{t_{ij}^{max} - t_{ij}^{min}}{K_{ij}} \quad (19)$$

and $$0 \leq T_{ij}^{\varphi} \leq K_{ij}, T_{ij}^{\varphi}, \in \{\text{integers}\}, \quad (20)$$

where, $t_{ij}^{min}$, $t_{ij}^{max}$ respectively represents a minimum transformer ratio and a maximum transformer ratio of the transformer in the branch ij, $T_{ij}^{\varphi}$ represents an adjustable tap position of the transformer in the branch ij, $\Delta t_{ij}$ represents an adjustable step length of the transformer ratio of the transformer in the branch ij, and $K_{ij}$ represents a maximum adjustable tap position of the transformer ratio of the transformer in the branch ij.

3. The method according to claim 2, wherein, the linearized model of the transformer is obtained by performing linearization on the adjustment model with adjustable tap positions as following formulas:

$$U_{jt}^{\varphi} = t_{ij}^{min} m_{ij}^{\varphi} + \Delta t_{ij} \sum_{n=0}^{N_{ij}} 2^n y_{ij,n}^{\varphi} \quad (21)$$

$$m_{ij}^{\varphi} = t_{ij}^{min} U_j^{\varphi} + \Delta t_{ij} \sum_{n=0}^{N_{ij}} 2^n x_{ij,n}^{\varphi} \quad (22)$$

$$0 \leq U_j^{\varphi} - x_{ij,n}^{\varphi} \leq (1 - \lambda_{ij,n}^{\varphi})M \quad (23)$$

$$0 \leq x_{ij,n}^{\varphi} \leq \lambda_{ij,n}^{\varphi} M \quad (24)$$

$$0 \leq m_{ij}^{\varphi} - y_{ij,n}^{\varphi} \leq (1 - \lambda_{ij,n}^{\varphi})M \quad (25)$$

$$0 \leq y_{ij,n}^{\varphi} \leq \lambda_{ij,n}^{\varphi} M \quad (26)$$

$$\Delta t_{ij} = \frac{t_{ij}^{max} - t_{ij}^{min}}{K_{ij}} \quad (27)$$

$$\sum_{n=0}^{N_{ij}} 2^n \lambda_{ij,n}^{\varphi} \leq K_{ij} \quad (28)$$

and $$\lambda_{ij,n}^{\varphi} \in \{0, 1\}, \quad (29)$$

where, $m_{ij}^{\varphi}$, $y_{ij,n}^{\varphi}$ and $x_{ij,n}^{\varphi}$ are continuous variables, $\lambda_{ij,n}^{\varphi}$ is a variable varying in 0-1 interval, $N_{ij}$ is given as:

$$\min_{N_{ij}} \sum_{n=0}^{N_{ij}} 2^n,$$

subject to $$\sum_{n=0}^{N_{ij}} 2^n \geq K_{ij},$$

such that calculated $N_{ij}$ may ensure that $$\sum_{n=0}^{N_{ij}} 2^n \lambda_{ij,n}^{\varphi}$$

may represent all adjustable tap positions of the transformer with a minimum number of $\lambda_{ij,n}^{\varphi}$, M is a large positive number (usually be valued as 1000), and a constraint $$\sum_{n=0}^{N_{ij}} 2^n \lambda_{ij,n}^{\varphi} \leq K_{ij}$$

is to ensure an interval of the a tap position of the transformer is not exceed the maximum tap position.

4. The method according to claim 1, wherein, the operation constraint of the continuous reactive power compensator is denoted by a formula of $$Q_{i,com}^{\varphi,min} \leq Q_{i,com}^{\varphi,con} \leq Q_{i,com}^{\varphi,max} \quad (30)$$

where, i represents the node, $\varphi$ represents three phases A, B, and C, $Q_{i,com}^{\varphi,con}$ is a reactive power of a continuous reactive power compensator connected to the node i, $Q_{i,com}^{\varphi,min}$ and $Q_{i,com}^{\varphi,max}$ respectively represents a minimum and a maximum reactive power of the continuous reactive power compensator connected to the node i;

wherein, the operation constraint of the grouping switching capacitor is denoted by formulas of $$Q_{i,com}^{\varphi,dis} = d_i^{\varphi} Q_{i,com}^{\varphi,step} \quad (31)$$

$$0 \leq d_i^{\varphi} \leq D_i \quad (32)$$

and $$d_i^{\varphi} \in \{\text{integers}\} \quad (33),$$

where, $Q_{i,com}^{\varphi,dis}$ represents a three-phase reactive power of a grouping switching capacitor connected to the node i, $Q_{i,com}^{\varphi,step}$ represents a reactive power for each group of continuous reactive power compensators connected to the node i, $d_i^{\varphi}$ is an integer variable, and $D_i$ represents the maximum group number of continuous reactive power compensators connected to the node i;

wherein, the operation constraint of the distributed generators is denoted by formulas of $$0 \leq P_{i,DG}^{\varphi} \leq P_{i,DG}^{\varphi,pre} \quad (34)$$

$$0 \leq Q_{i,DG}^{\varphi} \leq Q_{i,DG}^{\varphi,pre} \quad (35)$$

and $$Q_{i,DG}^{\varphi,pre} = P_{i,DG}^{\varphi,pre} \tan \theta \quad (36),$$

where, $P_{i,DG}^{\varphi}$, $Q_{i,DG}^{\varphi}$ respectively represents an active power and a reactive power of a distributed generator connected to the node i, $P_{i,DG}^{\varphi,pre}$, $Q_{i,DG}^{\varphi,pre}$ respectively represents a predicted active power and a predicted reactive power of the distributed generator connected to the node i, and $\theta$ represents a power factor angle of the distributed generators connected to the node i;

wherein, the safety operation constraint in the active distribution network is denoted by formulas of $$U^{min} \leq U_i^{\varphi} \leq U^{max} \quad (37)$$

$$L_{ij}^{\varphi} \leq L^{max} \quad (38)$$

where, $U_i^\varphi$ represents a square of a three-phase voltage of the node i, $U^{min}$ and $U^{max}$ respectively represents a square of a three-phase minimum voltage and a square of a maximum three-phase voltage in the active power distribution network, ij represents a branch with the transformer and having the nodes i and j, $L_{ij}^\varphi$ represents a square of a three-phase current of the branch ij, and $L^{max}$ represents a square of a maximum current of the branch ij.

5. The method according to claim 1, wherein, a mixed integer second-order cone programming method is used to solve the power loss objective function according to the second power flow equations, the linearized model of the transformer, the operation constraint of the continuous reactive power compensator, the operation constraint of the grouping switching capacitor, the operation constraint of the distributed generator and the safety operation constraint in the active distribution network, so as to obtain the three-phase active power and the three-phase reactive power of the distributed generator, the three-phase reactive power of the continuous reactive power compensator, the three-phase reactive power of the grouping switching capacitor and the adjustable tap position of the transformer in the active distribution network.

6. The method according to claim 1, wherein, the power loss objective function is denoted by a formula of $$\min \Sigma R_{ij}^\varphi I_{ij}^{\varphi 2} \tag{39}$$

where, i and j respectively represents the node, ij represents a branch with the transformer or without the transformer and having the nodes i and j as two ends, φ represents three phases A, B, and C, $R_{ij}^\varphi$ represents a three-phase branch resistance of the branch ij, $I_{ij}^\varphi$ represents a three-phase branch current of the branch ij and min represents a minimum operator.

7. A device for controlling an active distribution network, comprising:
a processor; and
a memory, configured to store instructions executable by the processor;
wherein, the processor is configured to:
create a power loss objective function for power flow of the active distribution network, wherein, the power loss objective function is a minimizing function of power loss of the active distribution network, the active distribution network comprises nodes, branches with the transformer and branches without the transformer;
determine first power flow equations for the active distribution network;
obtain second power flow equations by performing linearization on the first power flow equations;
determine a sub-scale adjustment model of a transformer in the active distribution network;
obtain a linearized model of the transformer by performing linearization on the sub-scale adjustment model; and
obtain a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, wherein the active distribution network is controlled by the obtained three-phase active power and a three-phase reactive power of a distributed generator, the three-phase reactive power of a continuous reactive power compensator, the three-phase reactive power of a grouping switching capacitor, and the adjustable tap position of the transformer in the active distribution network to minimize power loss, the controlling causes precise adjustment of tap position of the transformer
wherein, the first power flow equations comprises a three-phase branch-type flow equation for each node, a three-phase branch-type flow equation for each branch with the transformer, and a three-phase branch-type flow equation for each branch without the transformer;
wherein, the three-phase branch-type flow equation for a node j is denoted by formulas of $$\sum_{i \in \Phi(j)} \left( P_{ij}^\varphi - \frac{P_{ij}^{\varphi 2} + Q_{ij}^{\varphi 2}}{V_i^{\varphi 2}} R_{ij}^\varphi \right) + P_j^\varphi = 0 \text{ and} \tag{1}$$

$$\sum_{i \in \Phi(j)} \left( Q_{ij}^\varphi - \frac{P_{ij}^{\varphi 2} + Q_{ij}^{\varphi 2}}{V_i^{\varphi 2}} X_{ij}^\varphi \right) + Q_j^\varphi = 0 \tag{2}$$

where Φ(j) represents a node-set composed by nodes connected to the node j, i represents a node non-identical to the node j and belonging to Φ(j), ij represents a branch with the transformer and having the nodes i and j as two ends, φ represents three phases A, B, and C, $P_{ij}^\varphi$, $Q_{ij}^\varphi$ respectively represents a three-phase active power and a three-phase reactive power at a head end of the branch ij, $V_i^\varphi$ represents a three-phase voltage amplitude of the node i, $R_{ij}^\varphi$ represents a three-phase branch resistance of the branch ij, $P_j^\varphi$, $Q_j^\varphi$ respectively represents a three-phase active power net injection and a three-phase reactive power net injection of the note j, and $X_{ij}^\varphi$ represents a three-phase branch reactance of the branch circuit ij;
wherein, the branch-type flow equation for the branch ij with the transformer is denoted by formulas of $$V_i^{\varphi 2} - V_{ji}^{\varphi 2} = 2(R_{ij}^\varphi P_{ij}^\varphi + X_{ij}^\varphi Q_{ij}^\varphi) - (R_{ij}^{\varphi 2} + X_{ij}^{\varphi 2}) \frac{P_{ij}^{\varphi 2} + Q_{ij}^{\varphi 2}}{V_i^{\varphi 2}} \text{ and} \tag{3}$$

$$V_{ji}^\varphi = t_{ij}^\varphi V_j^\varphi \tag{4}$$

where, $t_{ij}^\varphi$ represents a three-phase transformer ratio of the transformer in the branch ij, and $V_j^\varphi$ represents a three-phase voltage amplitude of the node j;
wherein, the three-phase branch-type flow equation for a branch kl without the transformer is denoted by a formula of $$V_k^{\varphi 2} - V_l^{\varphi 2} = 2(R_{kl}^\varphi P_{kl}^\varphi + X_{kl}^\varphi Q_{kl}^\varphi) - (R_{kl}^{\varphi 2} + X_{kl}^{\varphi 2}) \frac{P_{kl}^{\varphi 2} + Q_{kl}^{\varphi 2}}{V_k^{\varphi 2}} \tag{5}$$

where, k and l respectively represents the node, $V_k^\varphi$, $V_l^\varphi$ respectively represents a three-phase voltage amplitude of the node k and the node l, $P_{kl}^\varphi$, $Q_{kl}^\varphi$ respectively represents a three-phase active power and a three-phase reactive power at a head end of the branch kl, $R_{kl}^\varphi$, $X_{kl}^\varphi$ respectively represents a three-phase branch resistance and a three-phase branch reactance of the branch kl;

wherein, the three-phase active power net injection and the three-phase reactive power net injection of the node j are denoted respectively by formulas of $$P_j^\varphi = P_{j,DG}^\varphi - P_{j,d}^\varphi \quad (6)$$

and $$Q_j^\varphi = Q_{j,DG}^\varphi + Q_{j,com}^{\varphi,dis} + Q_{j,com}^{\varphi,con} - Q_{j,d}^\varphi \quad (7)$$

wherein $P_{j,DG}^\varphi$ and $Q_{j,DG}^\varphi$ respectively represents a three-phase active power and a three-phase reactive power of a distributed generator connected to the node j, $P_{j,d}^\varphi$, $Q_{j,d}^\varphi$ respectively represents a three-phase active power and a three-phase reactive power of a load connected to the node j, $Q_{j,com}^{\varphi,dis}$ represents a three-phase reactive power of a grouping switching capacitor connected to the node j, and $Q_{j,com}^{\varphi,con}$ represents a three-phase reactive power of a continuous reactive power compensator connected to the node j, wherein, obtaining second power flow equations by performing linearization on the first power flow equations comprises:

transforming respectively the first power flow equations comprising the formulas (1)-(5) to linear equations (8)-(12) as follows by using the second-order cone relaxation method, in which $$\sum_{i \in \Phi(j)} (P_{ij}^\varphi - L_{ij}^\varphi R_{ij}^\varphi) + P_j^\varphi = 0 \quad (8)$$

$$\sum_{i \in \Phi(j)} (Q_{ij}^\varphi - L_{ij}^\varphi X_{ij}^\varphi) + Q_j^\varphi = 0 \quad (9)$$

$$U_i^\varphi - U_{jt}^\varphi = 2(R_{ij}^\varphi P_{ij}^\varphi + X_{ij}^\varphi Q_{ij}^\varphi) - (R_{ij}^{\varphi 2} + X_{ij}^{\varphi 2}) L_{ij}^\varphi \quad (10)$$

$$U_{jt}^\varphi = t_{ij}^{\varphi 2} U_j^\varphi \quad (11)$$

$$U_k^\varphi - U_l^\varphi = 2(R_{kl}^\varphi P_{kl}^\varphi + X_{kl}^\varphi Q_{kl}^\varphi) - (R_{kl}^{\varphi 2} + X_{kl}^{\varphi 2}) L_{kl}^\varphi \quad (12)$$

and adding second-order cone relaxation constraints:

$$L_{ij}^\varphi \geq \frac{P_{ij}^{\varphi 2} + Q_{ij}^{\varphi 2}}{U_i^\varphi} \quad (13)$$

$$L_{kl}^\varphi \geq \frac{P_{kl}^{\varphi 2} + Q_{kl}^{\varphi 2}}{U_k^\varphi} \quad (14)$$

where, $U_i^\varphi$, $U_j^\varphi$, $U_{jt}^\varphi$, $U_k^\varphi$, $U_l^\varphi$, $L_{ij}^\varphi$ and $L_{kl}^\varphi$ is respectively denoted by following formulas:

$$U_i^\varphi = V_i^{\varphi 2}, U_j^\varphi = V_j^{\varphi 2}, U_{jt}^\varphi = V_{jt}^{\varphi 2}, U_k^\varphi = V_k^{\varphi 2}, U_l^\varphi = V_l^{\varphi 2} \quad (15)$$

$$L_{ij}^\varphi = I_{ij}^{\varphi 2}, L_{kl}^\varphi = I_{kl}^{\varphi 2} \quad (16),$$

$U_i^\varphi$, $U_j^\varphi$, $U_{jt}^\varphi$, $U_k^\varphi$, $U_l^\varphi$, $L_{ij}^\varphi$ and $L_{kl}^\varphi$ represent the square of $V_i^\varphi$, $V_j^\varphi$, $V_{jt}^\varphi$, $V_k^\varphi$, $V_l^\varphi$, $I_{ij}^\varphi$ and $I_{kl}^\varphi$, respectively, the second power flow equations comprising the formulas (8)-(14).

8. A non-transitory computer-readable storage medium having stored therein instructions that, when executed by a processor of a device, causes the device to perform a method for controlling an active distribution network on a user device, the method comprising:

creating a power loss objective function for power flow of the active distribution network, wherein, the active distribution network comprises nodes, branches with the transformer and branches without the transformer;

determining first power flow equations for the active distribution network;

obtaining second power flow equations by performing linearization on the first power flow equations;

determining a sub-scale adjustment model of a transformer in the active distribution network;

obtaining a linearized model of the transformer by performing linearization on the sub-scale adjustment model; and obtaining a three-phase active power and a three-phase reactive power of a distributed generator, a three-phase reactive power of a continuous reactive power compensator, a three-phase reactive power of a grouping switching capacitor, and an adjustable tap position of the transformer in the active distribution network by solving the power loss objective function according to the second power flow equations, the linearized model of the transformer, an operation constraint of the continuous reactive power compensator, an operation constraint of the grouping switching capacitor, an operation constraint of the distributed generator and a safety operation constraint in the active distribution network, wherein the active distribution network is controlled by the obtained three-phase active power and a three-phase reactive power of a distributed generator, the three-phase reactive power of a continuous reactive power compensator, the three-phase reactive power of a grouping switching capacitor, and the adjustable tap position of the transformer in the active distribution network to minimize power loss, the controlling causes precise adjustment of tap position of the transformer wherein, the first power flow equations comprises a three-phase branch-type flow equation for each node, a three-phase branch-type flow equation for each branch with the transformer, and a three-phase branch-type flow equation for each branch without the transformer;

wherein, the three-phase branch-type flow equation for a node j is denoted by formulas of $$\sum_{i \in \Phi(j)} \left( P_{ij}^\varphi - \frac{P_{ij}^{\varphi 2} + Q_{ij}^{\varphi 2}}{V_i^{\varphi 2}} R_{ij}^\varphi \right) + P_j^\varphi = 0 \text{ and} \quad (1)$$

$$\sum_{i \in \Phi(j)} \left( Q_{ij}^\varphi - \frac{P_{ij}^{\varphi 2} + Q_{ij}^{\varphi 2}}{V_i^{\varphi 2}} X_{ij}^\varphi \right) + Q_j^\varphi = 0 \quad (2)$$

where, $\Phi(j)$ represents a node-set composed by nodes connected to the node j, i represents a node non-identical to the node j and belonging to $\Phi(j)$, ij represents a branch with the transformer and having the nodes i and j as two ends, $\varphi$ represents three phases A, B, and C, $P_{ij}^\varphi$, $Q_{ij}^\varphi$ respectively represents a three-phase active power and a three-phase reactive power at a head end of the branch ij, $V_i^\varphi$ represents a three-phase voltage amplitude of the node i, $R_{ij}$ represents a three-phase branch resistance of the branch ij, $P_j^\varphi$, $Q_j^\varphi$ respectively represents a three-phase active power net injection and a three-phase reactive power net injection of the note j, and $X_{ij}^\varphi$ represents a three-phase branch reactance of the branch circuit ij;

wherein, the branch-type flow equation for the branch ij with the transformer is denoted by formulas of $$V_i^{\varphi 2} - V_{jt}^{\varphi 2} = 2(R_{ij}^\varphi P_{ij}^\varphi + X_{ij}^\varphi Q_{ij}^\varphi) - (R_{ij}^{\varphi 2} + X_{ij}^{\varphi 2})\frac{P_{ij}^{\varphi 2} + Q_{ij}^{\varphi 2}}{V_i^{\varphi 2}} \text{ and} \quad (3)$$

$$V_{jt}^\varphi = t_{ij}^\varphi V_j^\varphi \quad (4)$$

where, $t_{ij}^\varphi$ represents a three-phase transformer ratio of the transformer in the branch ij, and $V_j^\varphi$ represents a three-phase voltage amplitude of the node j;

wherein, the three-phase branch-type flow equation for a branch kl without the transformer is denoted by a formula of $$V_k^{\varphi 2} - V_l^{\varphi 2} = 2(R_{kl}^\varphi P_{kl}^\varphi + X_{kl}^\varphi Q_{kl}^\varphi) - (R_{kl}^{\varphi 2} + X_{kl}^{\varphi 2})\frac{P_{kl}^{\varphi 2} + Q_{kl}^{\varphi 2}}{V_k^{\varphi 2}} \quad (5)$$

where, k and l respectively represents the node, $V_k^\varphi$, $V_l^\varphi$ respectively represents a three-phase voltage amplitude of the node k and the node l, $P_{kl}^\varphi$, $Q_{kl}^\varphi$ respectively represents a three-phase active power and a three-phase reactive power at a head end of the branch kl, $R_{kl}^\varphi$, $X_{kl}^\varphi$ respectively represents a three-phase branch resistance and a three-phase branch reactance of the branch kl;

wherein, the three-phase active power net injection and the three-phase reactive power net injection of the node j are denoted respectively by formulas of $$P_j^\varphi = P_{j,DG}^\varphi - P_{j,d}^\varphi \quad (6)$$

and $$Q_j^\varphi = Q_{j,DG}^\varphi + Q_{j,com}^{\varphi,dis} + Q_{j,com}^{\varphi,con} - Q_{j,d}^\varphi \quad (7)$$

wherein, $P_{j,DG}^\varphi$ and $Q_{j,DG}^\varphi$ respectively represents a three-phase active power and a three-phase reactive power of a distributed generator connected to the node j, $P_{j,d}^\varphi$, $Q_{j,d}^\varphi$ respectively represents a three-phase active power and a three-phase reactive power of a load connected to the node j, $Q_{j,com}^{\varphi,dis}$ represents a three-phase reactive power of a grouping switching capacitor connected to the node j, and $Q_{j,com}^{\varphi,con}$ represents a three-phase reactive power of a continuous reactive power compensator connected to the node j, wherein, obtaining second power flow equations by performing linearization on the first power flow equations comprises:

transforming respectively the first power flow equations comprising the formulas (1)-(5) to linear equations (8)-(12) as follows by using the second-order cone relaxation method, in which $$\sum_{i\in\Phi(j)} (P_{ij}^\varphi - L_{ij}^\varphi R_{ij}^\varphi) + P_j^\varphi = 0 \quad (8)$$

$$\sum_{i\in\Phi(j)} (Q_{ij}^\varphi - L_{ij}^\varphi X_{ij}^\varphi) + Q_j^\varphi = 0 \quad (9)$$

$$U_i^\varphi - U_{jt}^\varphi = 2(R_{ij}^\varphi P_{ij}^\varphi + X_{ij}^\varphi Q_{ij}^\varphi) - (R_{ij}^{\varphi 2} + X_{ij}^{\varphi 2})L_{ij}^\varphi \quad (10)$$

$$U_{jt}^\varphi = t_{ij}^{\varphi 2} U_j^\varphi \quad (11)$$

$$U_k^\varphi - U_l^\varphi = 2(R_{kl}^\varphi P_{kl}^\varphi + X_{kl}^\varphi Q_{kl}^\varphi) - (R_{kl}^{\varphi 2} + X_{kl}^{\varphi 2})L_{kl}^\varphi \quad (12)$$

and adding second-order cone relaxation constraints:

$$L_{ij}^\varphi \geq \frac{P_{ij}^{\varphi 2} + Q_{ij}^{\varphi 2}}{U_i^\varphi} \quad (13)$$

$$L_{kl}^\varphi \geq \frac{P_{kl}^{\varphi 2} + Q_{kl}^{\varphi 2}}{U_k^\varphi} \quad (14)$$

where, $U_i^\varphi$, $U_j^\varphi$, $U_{jt}^\varphi$, $U_k^\varphi$, $U_l^\varphi$, $L_{ij}^\varphi$ and $L_{kl}^\varphi$ is respectively denoted by following formulas:

$$U_i^\varphi = V_i^{\varphi 2}, U_j^\varphi = V_j^{\varphi 2}, U_{jt}^\varphi = V_{jt}^{\varphi 2}, U_k^\varphi = V_k^{\varphi 2}, U_l^\varphi = V_l^{\varphi 2} \quad (15)$$

$$L_{ij}^\varphi = I_{ij}^{\varphi 2}, L_{kl}^\varphi = I_{kl}^{\varphi 2} \quad (16),$$

$U_i^\varphi$, $U_j^\varphi$, $U_{jt}^\varphi$, $U_k^\varphi$, $U_l^\varphi$, $L_{ij}^\varphi$ and $L_{kl}^\varphi$ represent the square of $V_i^\varphi$, $V_j^\varphi$, $V_{jt}^\varphi$, $V_k^\varphi$, $V_l^\varphi$, $I_{ij}^\varphi$ and $I_{kl}^\varphi$, respectively, the second power flow equations comprising the formulas (8)-(14).

* * * * *